United States Patent
Gonthier et al.

[11] Patent Number: 5,818,584
[45] Date of Patent: Oct. 6, 1998

[54] MULTIPORT OPTICAL WAVEGUIDE INTERFEROMETER HAVING A FLAT WAVELENGTH RESPONSE

[75] Inventors: François Gonthier, Montreal; Suzanne Lacroix, Verdun, both of Canada

[73] Assignee: Framatome Connectors Canada, Inc., Fairfield, Conn.

[21] Appl. No.: 776,082
[22] PCT Filed: Jul. 17, 1995
[86] PCT No.: PCT/CA95/00421
§ 371 Date: Jan. 17, 1997
§ 102(e) Date: Jan. 17, 1997
[87] PCT Pub. No.: WO96/03668
PCT Pub. Date: Feb. 8, 1996
[51] Int. Cl.$^6$ .................................................. G01B 9/02
[52] U.S. Cl. ........................ 356/345; 385/27; 250/227.27
[58] Field of Search ............................... 356/345; 385/12, 385/14, 27, 29; 250/227.19, 227.27

[56] References Cited

U.S. PATENT DOCUMENTS 5,119,453  6/1992  Gonthier et al. .......................... 385/43
5,351,325  9/1994  Miller et al. ............................. 356/345

FOREIGN PATENT DOCUMENTS 3824613  8/1990  European Pat. Off. .
5223051  1/1993  European Pat. Off. .
5910421  4/1994  European Pat. Off. .

Primary Examiner—Samuel A. Turner
Attorney, Agent, or Firm—Perman & Green, LLP

[57] ABSTRACT

A multiport optical waveguide interferometer is provided which comprises at least two N×N couplers arranged in series on an array of fibers and separated by a short region such that the phase shift between the couplers is approximately equal to π. A method for making such an interferometer comprises forming such couplers, for instance by a fused taper method with appropriate twist, where the fused, tapered and twisted zone is longer than usual and wherein the couplers are formed in series within such zone, separated by short regions of between 1–2 mm, and adjusted to achieve the flattest possible wavelength response.

11 Claims, 1 Drawing Sheet

MULTIPORT OPTICAL WAVEGUIDE INTERFEROMETER HAVING A FLAT WAVELENGTH RESPONSE

TECHNICAL FIELD

The present invention relates to optical waveguide interferometers, which may be used as optical splitters, which involve more than two waveguides and to a method of making the same.

BACKGROUND OF THE INVENTION

Optical waveguide interferometers, which may be used as optical splitters, are composed of two or more optical waveguide couplers which couple more than two waveguides. In order to make them, more than one of the output ports of a first coupler are connected to the input ports of the following coupler with waveguides of prescribed lengths such as to create an optical interferometer. The control of the coupler properties and the phase shift between two successive couplers is used to adjust the output transmission properties of the interferometer, such as to produce essentially wavelength insensitive responses.

The present invention is an improvement to the invention disclosed in U.S. Pat. No. 5,119,453, which describes a wavelength flattened 2×2 splitter made on the basis of a Mach-Zehnder interferometer structure. In said U.S. Patent the splitter was made by concatenating two 2×2 waveguide couplers of predetermined wavelength response and by inducing a phase shift between the waveguides connecting the two couplers so that the wavelength response of the first coupler compensates the wavelength dependency of the second coupler. The invention in U.S. Pat. No. 5,119,453 is useful to make 2×2 spitters, but does not permit the fabrication of 1×N splitters other than concatenating 2×2 couplers in a tree arrangement. It was surprisingly found in accordance with the present invention that, under certain conditions, the principle described in U.S. Pat. No. 5,119,453 of compensating the wavelength dependency of a first coupler with a second coupler can be extended to couplers involving more than 2 waveguides, thus allowing manufacture of a 1×N splitter which is much more compact than any such splitter produced previously.

SUMMARY OF THE INVENTION

The present invention is directed to a waveguide interferometer made by concatenating 2 or more N×N couplers, thereby creating a structure which has wavelength properties different from the individual couplers. In particular, this structure can produce a 1×N splitter which has a reduced wavelength sensitivity. To create this interferometer, the N output ports of a first coupler are connected to the N input ports of a second coupler. The wavelength properties of each coupler and the phase differences induced to the signals in each of the waveguides connecting the couplers must be properly chosen, just like in the case of the above mentioned Mach-Zehnder interferometer disclosed in U.S. Pat. No. 5,119,453. The special condition to realize this device will be made clear in the following description of the invention.

One object of this invention is the fabrication of a waveguide interferometer composed of two or more waveguide couplers having more than two waveguides, wherein the couplers are placed in series, the output waveguides of the first coupler being linked to the input waveguides of the second coupler and so on.

Another object of this invention is to provide this waveguide interferometer with a low wavelength sensitivity which is created by selecting the couplers of the interferometer and the phase shifts in the interferometer such that the wavelength dependencies of the couplers compensate each other.

A further object of this invention is to fabricate the above mentioned interferometer using single-mode optical fibers.

A still further object is for the waveguide interferometer to be composed of two N×N couplers made by placing N−1 fibers around a central fiber, the optical length of the central fiber between the couplers being different from the optical lengths of the outer fibers, such structure having low wavelength sensitivity.

Still another object of this invention is to provide a fabrication method for realizing and tuning such waveguide interferometer.

Other objects and advantages of this invention will be apparent from the following more detailed description thereof.

The technology used to produce such a waveguide interferometer is normally the fused taper technology. This, however, does not limit the scope of this invention to such fiber technology, since the interferometer structure could also be made using other technologies, such as integrated optics.

Though this waveguide interferometer can have other functions, the main use described herein is to produce a 1×N splitter having a low wavelength sensitivity. This structure is realized by concatenating two N×N couplers, each made by placing N−1 fibers around a central fiber, where N>2, as for instance described in Canadian Patent Application No. 2,123,757 filed May 17, 1994 and entitled "Method for Making Optical Waveguide Couplers with Low Wavelength Sensitivity and Couplers Thereby Produced". Such fabrication method can be used to control the wavelength properties of each of the couplers. The two couplers are made in series on the same fiber array and thus all the output ports of the first coupler are automatically connected to the input ports of the second coupler, the outer fibers of the first coupler being connected with outer fibers of the second coupler and the central fibers being connected together. If the fiber array is twisted along its length, then the optical path in the outer fibers is longer than in the central fiber because the outer fibers are wound around the central fiber. Thus, between the two couplers, this automatically produces a phase shift between the central fiber and the outer fibers, phase shift which is then controlled by the amount of twist and the distance between the two couplers.

The principle of operation of a 1×N fused fiber coupler is well described in Canadian Patent Application No. 2,123,757. The important physical property to remember for these couplers is the fact that though there are N fibers, when you excite such a structure symmetrically, that is, you either launch power in the central fiber only or you launch power in all fibers, but with the same complex amplitude in all the outer fibers, you only excite two modes of the structure. If two couplers are concatenated in the fashion described above, the ring symmetry of the coupler is preserved and the 2-mode model still applies to the second coupler. For a structure which preserves this symmetry, one can apply the Mach-Zehnder wavelength compensation effect described in the U.S. Pat. No. 5,119,453 with the following analogies.

The Mach-Zehnder structure of U.S. Pat. No. 5,119,453 is based on two waveguides on which are made two couplers. The optical properties of the couplers are explained by the beating of 2 modes in the coupler sections. This beating creates a sinusoidal dependence in the coupler transmission as a function of wavelength. This dependence is compensated in the Mach-Zehnder structure by the second coupler if the phase shift in the region between the couplers is approximately π. This principle can be directly applied to the 1×N waveguide interferometer if one considers not 2 identical waveguides as in the case of the Mach-Zehnder, but a central waveguide composed of the central fiber, and a ring of waveguides composed of the N−1 outer fibers.

If the power exchange in the 1×N coupler is complete for a given phase, then the equations describing the behaviour of the Mach-Zehnder structure for the main waveguide (the waveguide in which the power is launched) and the ones describing the transmission in the central fiber in the 1×N waveguide interferometer, are exactly identical, i.e., if the phase difference of the interferometer is π between the central fiber and the outer fibers, the transmission of the structure $T_1$ can be written as follows:

$$T_1 = \cos^2(\alpha_1 - \alpha_2)$$

where $a_1$ and $\alpha_2$ are the accumulated phase differences between the modes of the first and second coupler respectively. The transmission in the ring is thus $1-T_1$, and because of the symmetry, the transmission in each of the N−1 ring fibers is $(1-T_1)/(N-1)$. As in the Mach-Zehnder structure, if the two couplers have the same wavelength dependence then $T_1$ is wavelength insensitive and the absolute value of $T_1$ depends on the phase difference between the supermodes of each coupler. For wavelength insensitive 2×2 coupler made of a Mach-Zehnder structure, the condition to obtain a 50/50 split ratio was $$|\alpha_1 - \alpha_2| = \pi/4$$

For a 1×N waveguide interferometer structure, the condition for equipartition of power between the output ports of the coupler depends on the number of output ports N:

$$|\alpha_1 - \alpha_2| = \arccos(\sqrt{1/N})|$$

For example, for a 1×4 coupler we have $$|\alpha_1 - \alpha_2| = \pi/3$$

Using the Mach-Zehnder structure principle, it is thus possible to realise a 1×N wavelength insensitive coupler.

If the couplers are not quite perfect for this application, i.e., when the power exchange between the central fiber and the outer fibers is not complete, then the wavelength compensating effect still exists, but is not as perfect as in the case mentioned above. Canadian Patent Application No. 2,123,757 describes how to make and tune 1×N couplers so that this effect can be optimally used.

If the number of outer fibers is greater than 6, this effect still occurs as long as the outer fibers are maintained in equidistant relationship to the central fiber.

The fabrication procedure of this 1×N waveguide interferometer is very similar to the one described in Canadian Patent Application No. 2,123,757 and differs only in the following points.

The fiber preparation is exactly the same, i.e., the fibers are stripped of their protective coating, cleaned and set in the appropriate transversal geometry by special fiber holders, except that the region where the fibers are twisted together is somewhat longer because two or more couplers are to be made on that structure instead of one. The first coupler is thus fabricated by heating on one side of this region where the fibers are laterally in contact, and the elongation is made to a predetermined coupling ratio. The second coupler is then fabricated on the other side of this region, the small distance (1–2 mm) between the two couplers being carefully chosen so that there is approximately π phase shift between the central fiber and each of the outer fibers. This section can be bonded to a substrate and each coupler can then be individually tuned by twisting, so that the total response of this waveguide interferometer is as wavelength independent as possible.

The foregoing and other objects, features and advantages of the present invention will be described in greater detail with respect to exemplary embodiments thereof, as illustrated in the accompanying drawings.

DESCRIPTION OF THE PREFERRED EMBODIMENT

Figure 1:
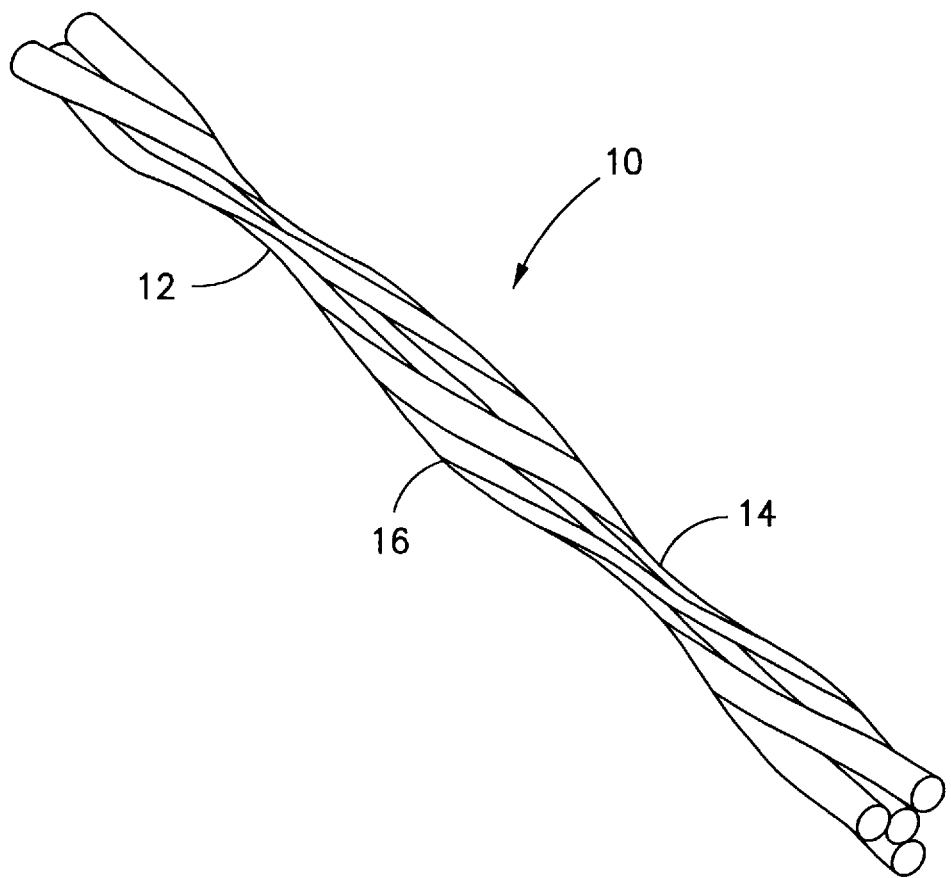
FIG. 1 of the drawings, which is the only FIGURE in this application, illustrates a waveguide interferometer of the present invention which comprises two couplers in series on the same array of fibers.

The preferred embodiment illustrated in FIG. 1 relates to a 1×4 optical fiber interferometer 10. The aim is to make a 1×4 splitter with a low wavelength sensitivity over the wavelength range of 1.2 to 1.6 μm. The fabrication procedure is as already described above. The twisted region where the fibers are in contact is longer by about 2 cm in this particular example as compared to making a single coupler. In this region, which is about 6 cm long, the fibers are twisted 540° before being bonded together. A pretaper is first fabricated, i.e., the structure is tapered in a uniform way over all its length to about half the original diameter, so the two couplers can be closer together. The first coupler 12 is then fabricated on one side of this structure as per the procedure described for the 1×4 coupler in Canadian Patent Application No. 2,123,757. The elongation is stopped after reaching the minimum transmission in the main port at 1,55 μm. The second coupler 14 is then made on the other side of this twisted region so that the phase difference in the middle section 16 between the central fiber and outer fibers is approximately π. This distance is short, about 1.2 mm with the pretaper, in this particular example. The second coupler 14 is elongated up to the point where the response is as flat as possible. The middle section 16 is then glued to a substrate and each coupler 12, 14 is twisted or untwisted until the flattest wavelength response is achieved. The final structure of the interferometer 10 is then glued to a substrate and encapsulation of the device can then be carried out to produce the final product.

Although the invention has been described with reference to a specific embodiment, many modifications obvious to those skilled in the art, particularly with reference to the prior art mentioned herein, can be made without departing from the spirit of the invention and the scope of the following claims.

We claim:

1. A multiport optical waveguide interferometer comprising at least two N×N couplers where N>2 arranged in series so that the output ports of one coupler are connected to input ports of the following coupler with waveguides of predetermined lengths within a short region between the couplers, said couplers being formed of and said waveguides within the short region consisting of N−1 outer identical waveguides symmetrically surrounding a central waveguide, wherein the optical length of the central waveguide between the couplers is different from the optical lengths of the outer waveguides so that the response of the interferometer is substantially insensitive to wavelength.

2. A multiport optical waveguide interferometer according to claim 1, wherein the short length between the couplers is 1–2 mm.

3. A multiport optical waveguide interferometer according to claim 1, wherein said waveguides are singlemode fibers.

4. A multiport optical waveguide interferometer according to claim 3, in which a phase shift is provided in the region between the couplers, said phase shift between the central fiber and each outer fiber being approximately equal to $\pi$.

5. A multiport optical waveguide interferometer according to claim 4, wherein said phase shift is achieved by bonding the region between the couplers to a substrate and turning each coupler individually by twisting so that the total response of the interferometer is as wavelength independent as possible.

6. A multiport optical waveguide interferometer according to claim 3, in which the arrangement of the fibers is such that N=4.

7. A multiport optical waveguide interferometer according to claim 1, which is used as an optical splitter.

8. A method of making an essentially wavelength insensitive multiport waveguide interferometer which comprises forming at least two N×N couplers where N>2 and arranging said couplers in series so that output ports of one coupler are connected to input ports of the following coupler with waveguides of predetermined lengths within a short region between the couplers, said couplers being formed of and said waveguides within the short region being made of N−1 outer identical waveguides symmetrically surrounding a central waveguide, wherein the optical length of the central waveguide between the couplers is different from the optical lengths of the outer waveguides so that the interferometer has the flattest possible wavelength response.

9. A method according to claim 8, in which the waveguides are singlemode fibers.

10. A method according to claim 9, in which the couplers are formed by a fused taper method with a longer fused-tapered zone than that required for making a single coupler, and are twisted to achieve the flattest possible wavelength response.

11. In a multiport optical waveguide interferometer comprising at least two optical waveguide couplers which are arranged in series and couple more than two waveguides and waveguides located in a region between the couplers, the waveguides having predetermined lengths and connecting output ports of a first one of the couplers to input ports of a following one of the couplers, wherein the improvement comprises:

the region between the couplers being bonded to a substrate and the first coupler being rotated relative to the following coupler to twist the waveguides within the region between the couplers so that the interferometer has a total response which is as wavelength independent as possible.

* * * * *